(12) United States Patent
Rashed

(10) Patent No.: US 7,132,376 B2
(45) Date of Patent: Nov. 7, 2006

(54) MULTI-LAYERED WOVEN SCRIM

(75) Inventor: Mohamed Abdel Aziz Rashed, Abbotsford (CA)

(73) Assignees: Interwrap, Inc., Mission (CA); IBCO SRL, St. Michael (BB)

( * ) Notice: Subject to any disclaimer, the term of this patent is extended or adjusted under 35 U.S.C. 154(b) by 167 days.

(21) Appl. No.: 10/785,149

(22) Filed: Feb. 24, 2004

(65) Prior Publication Data
US 2004/0171318 A1    Sep. 2, 2004

(30) Foreign Application Priority Data
Feb. 28, 2003 (CA) .................... 2420271

(51) Int. Cl.
*D04H 1/00* (2006.01)

(52) U.S. Cl. .............. 442/2; 442/33; 442/34; 442/35; 442/36; 442/38; 442/41; 442/49; 442/131; 442/136; 139/383 R

(58) Field of Classification Search ............ 442/2, 442/33, 34, 35, 36, 38, 41, 49, 131, 136; 139/383 R
See application file for complete search history.

(56) References Cited

U.S. PATENT DOCUMENTS

| | | | | |
|---|---|---|---|---|
| 4,239,831 A | * | 12/1980 | Pattenden | .............. 428/193 |
| 5,811,359 A | * | 9/1998 | Romanowski | .............. 442/261 |
| 5,843,554 A | * | 12/1998 | Katz | .............. 428/68 |
| 6,367,513 B1 | | 4/2002 | Cain | |
| 6,465,074 B1 | | 10/2002 | FitzPatrick et al. | |
| 2004/0192130 A1 | * | 9/2004 | Baciu et al | .............. 442/19 |
| 2005/0164576 A1 | * | 7/2005 | Qureshi et al. | .............. 442/136 |

* cited by examiner

*Primary Examiner*—Ula C. Ruddock
(74) *Attorney, Agent, or Firm*—Kirton & McConkie; Evan R. Witt

(57) ABSTRACT

A multi-layer woven scrim, having two or more layers made of thermoplastic tapes, has its layers attached together by means of layer-connecting tapes interwoven with mutually perpendicular tapes of adjacent layers. The points of attachment may be at spaced intervals and in the machine or cross-machine directions. The scrim is flexible, dimensionally stable and has high tensile and tear strength. It can be coated and used as an industrial fabric.

28 Claims, 3 Drawing Sheets

MULTI-LAYERED WOVEN SCRIM

FIELD OF THE INVENTION

The invention pertains to scrims made of woven thermoplastic tapes, and more particularly, to multiple-layer scrims having high tensile and tear strengths and suitable for industrial use.

BACKGROUND OF THE INVENTION

It is known in the field of industrial strength fabrics to make a woven scrim from thermoplastic tapes. Such tapes, commonly made of polyolefins such as high density polyethylene, stretched in the course of manufacture, are flexible, weavable and have high tensile strength. Scrims woven of such tapes have substantial mechanical strength and are used as a structural element of industrial fabrics such as tarpaulins, building covers, wrapping materials for industrial goods, and for similar uses. The strength of such scrims is limited by the number of tapes per unit area that can be woven together and the tensile strength of the individual tapes.

To produce higher strength scrims it is known to attach two or more layers together, typically by laminating or stitching. There are problems with both of these prior art methods that reduce the strength of the product. When laminating is carried out, due to the thickness of the scrims, it is difficult to cool down or temper the laminating layer, and consequently the scrim may be damaged by excessive heat, reducing its tensile strength. Alternatively, if scrim layers are stitched and sewn together, the stitches tend to create tears and splitting of the tapes and hence reduce tensile strength.

U.S. Pat. No. 6,367,513 (Cain) discloses a strengthened-scrim comprising a plain weave scrim wherein the warp and wefts ends comprise two or more superimposed tapes. However, when folded, the scrim may bend at the edges of the superimposed tapes, which, for a coated scrim, may result in cracking of the coating at the bends. Further, where more than two tapes are placed one on top of the other, difficulties arise in controlling the tension of the tapes in the middle and in adjusting the pick count according to the thickness of the ends, the number of superimposed tapes determining thickness of each end.

It is therefore desirable to provide a scrim that is woven in a multi-layer structure and wherein the aforementioned limitations are overcome, without reducing the strength of each layer and while avoiding additional processes such as laminating or sewing together of the layers, or process sophistications such as tension control in superimposing tapes.

SUMMARY OF INVENTION

It is an object of the invention to provide a high performance multi-layer scrim, wherein each layer is attached to the next one at points along the width, or length, or in both directions, while maintaining the integrity of each layer.

It is a further object of the invention to provide a multi-layer scrim wherein one or more layers may, if desired, have tapes with particular chemical properties, such as those imparted by UV stabilizers and fire retardants, or particular physical properties such as those imparted by colour pigments.

It is a further object of the invention to provide a multi-layer scrim that is wrinkle-free and wherein the salvage is shared between layers to avoid slippage of layers.

The present invention provides a multi-layer scrim for use in heavy-duty wraps, construction fabrics and covers, wherein characteristics such as tensile strength and tear strength in both the machine and the cross-machine directions, flexibility, flatness, or stability are important.

The invention provides a scrim comprising two or more layers, each layer comprising woven tapes that are mutually perpendicular (i.e. warp and weft tapes) wherein a layer-connecting tape, such a warp tape, is interwoven with mutually perpendicular tapes (such as the weft tapes) of both layers so as to attach the layers together. The attachment can be at selected points or intervals, or along lines of attachment, such lines of attachment being in the machine direction or the cross-machine direction.

The invention further provides a method for making a multi-layer scrim as aforesaid, comprising weaving tapes to form two or more layers and, simultaneously, weaving a layer-connecting tape, such as a warp tape, with mutually perpendicular tapes of adjacent layers, whereby adjacent layers are attached together to form the scrim.

The invention further provides industrial fabrics which comprise a multi-layer scrim according to the invention which is coated or laminated to a film, or to a layer of slip-resistant material, or to other substrates that may be suitable for a particular end use of the fabric.

DESCRIPTION OF THE PREFERRED EMBODIMENTS

The warp and weft tapes that are the structural elements of the scrims of the invention are thermoplastic tapes of a size and strength suitable for the manufacture of industrial strength scrims. In this specification, "tape" means a flexible, weavable, elongated member with a generally rectangular cross-section, having a width at least ten times larger than its thickness. The width of the tapes is preferably in the range of one to ten millimeters. The thickness of the tapes is preferably in the range of 0.02 to 0.1 mm. The weight of the tapes (measured as decitex, i.e. weight in grams per 10,000 meters in length) is preferably in the range of 500 to 3,000. The tapes can be made by slitting cast-extruded thermoplastic film into strands and stretching them from three to five times their original length to increase tensile strength and reduce stretch of the scrim. The tapes are preferably made of polyolefin material, such as high density polyethylene or polypropylene. Such tapes are flexible, weavable and have high tensile strength.

The tapes for use in the invention can contain one or more of various additives, to impart properties to the scrim that are useful for particular applications. For example, they may contain colour pigments, such as black pigment, to increase the resistance of the scrim to UV radiation, or pigments or compositions to increase reflectivity, UV-resistant compositions, flame-retardant compositions, mold inhibitors, metal corrosion inhibitors, etc.

Figure 1:
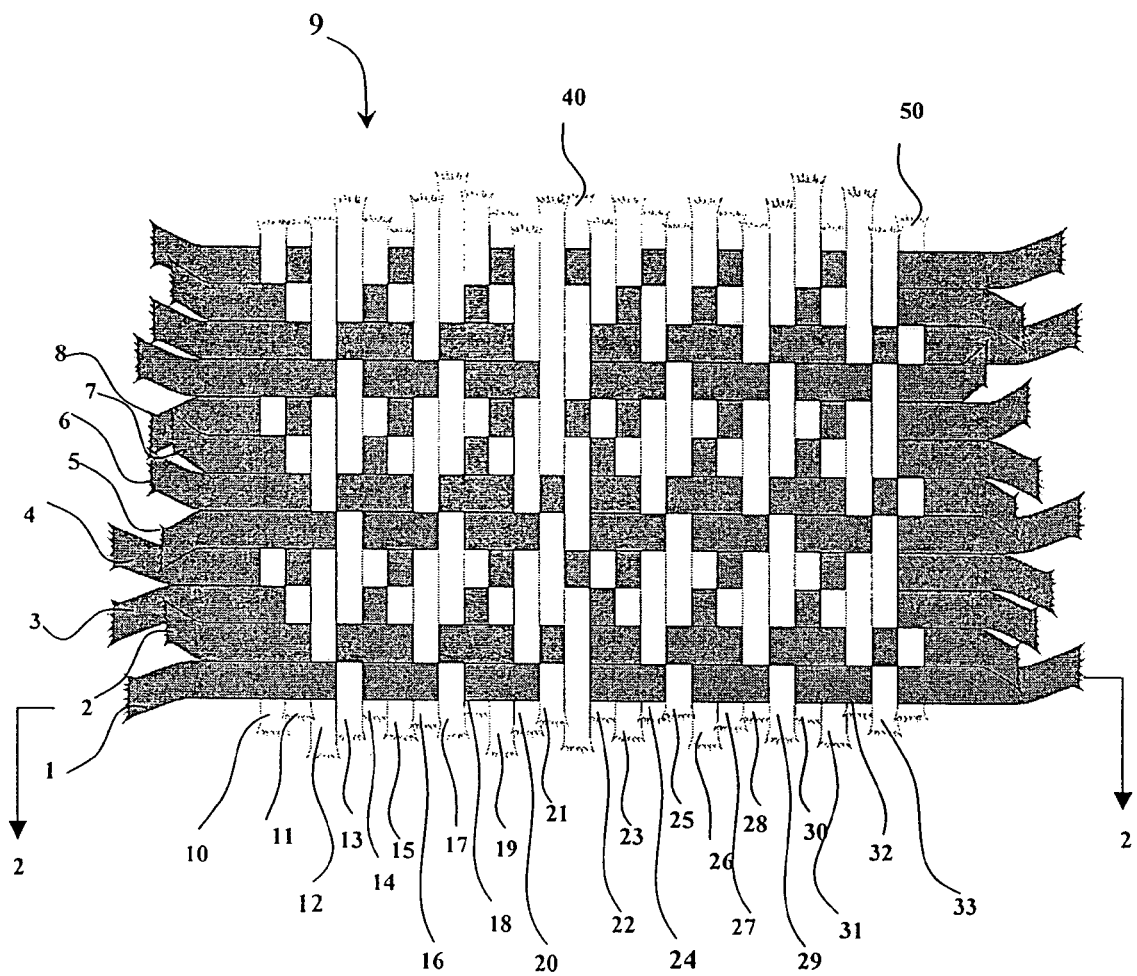
FIG. 1 is a schematic plan view of a portion of a two-layer scrim according to a preferred embodiment of the invention.
Figure 2:
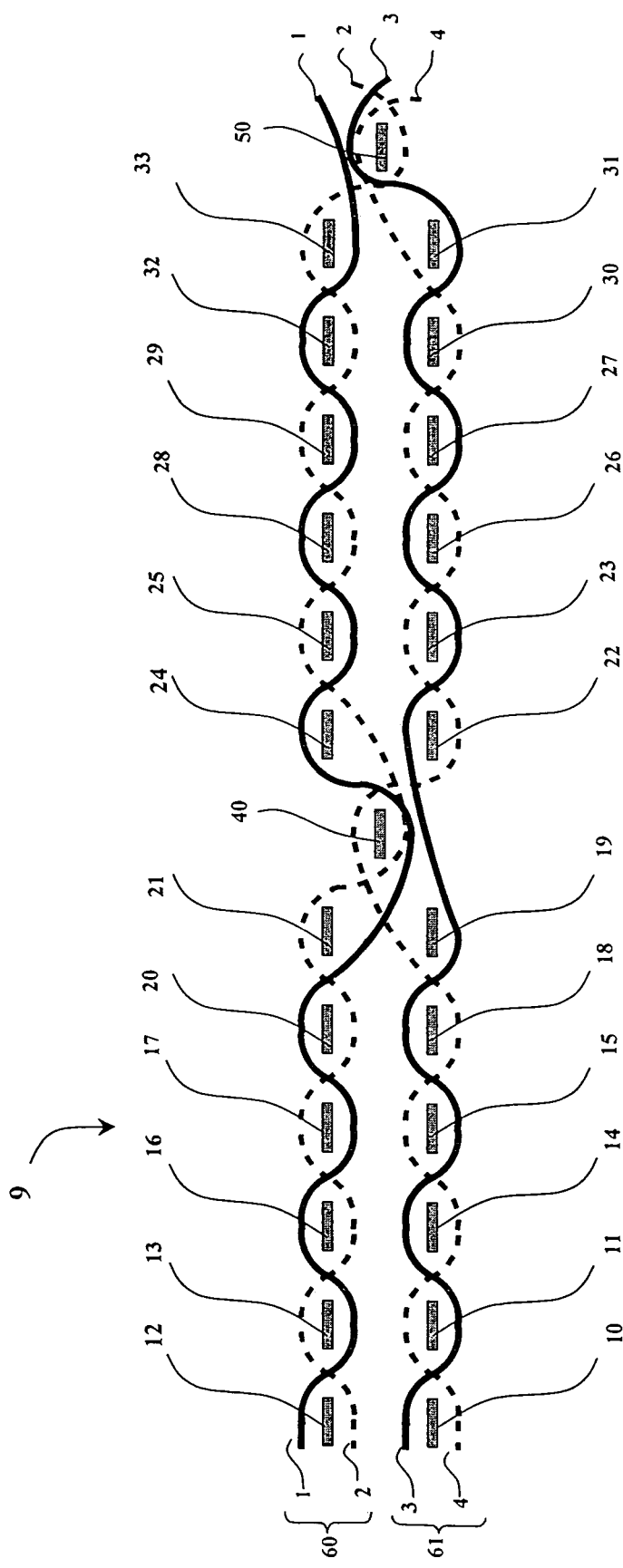
FIG. 2 is a schematic cross-sectional view taken along the line 2—2 of FIG. 1.

FIGS. 1 and 2 illustrate an embodiment of a two-layer scrim according to the present invention, in which two woven layers are attached together by means of interweaving a layer-connecting warp tape with weft tapes of both layers.

FIG. 1 is a plan view which, for purposes of illustration, shows both layers of scrim 9, but it will be understood that, in practice, when the tapes are tightly woven, the tapes of one layer are generally on top of those of the other layer. Scrim 9 comprises two layers, 60 and 61, attached together by means of layer-connecting tapes 40, 50. Layer 60 comprises weft tapes 1, 2, 5 and 6 interwoven with warp tapes 12, 13, 16, 17, 20, 21, 24, 25, 28, 29, 32 and 33 in a plain weave. Layer 61 comprises weft tapes 3, 4, 7 and 8, interwoven with warp tapes 10, 11, 14, 15, 18, 19, 22, 23, 26, 27, 30 and 31 in a plain weave. It will be understood that the portion of the weave pattern shown in FIG. 1, from warp weft tape 1 to 8 and weft tape 10 to 33, is repeated to form a scrim of the desired size.

Preferably, both layers are plain weave, but, if desired, other weave patterns may be employed.

Layer-connecting tapes 40, 50 are woven parallel to the warp tapes, at selected spaced intervals (here, after every twelfth warp tape) and are interwoven with selected weft tapes so as to connect the two layers. In the example illustrated in the drawings, layer-connecting tape 40 is woven under weft tapes 4 and 8 of layer 61 and over the other weft tapes; and layer-connecting tape 50 is woven over weft tapes 2 and 6 of layer 60 and over the other weft tapes.

It will be understood that the layer-connecting tapes can be woven in various patterns other than according to the specific pattern shown in the drawings and still attach the two layers together effectively. For example, layer-connecting tape 40 could be woven under weft tapes 3 and 7 and over the other weft tapes.

Preferably, a layer-connecting tape 40, 50 is provided at selected intervals, for example, every twelfth warp tape, or other selected interval, in order to attach the two layers 60, 61 together as firmly as required. This results in a set of spaced, parallel lines of attachment between the two layers. The frequency and location of the layer-connecting tapes can be selected according to the physical requirements of the scrim and the design of the loom. The shared salvage provides stability and stops the layers from sliding relative to each other in the course of manufacture and during any subsequent processing such as coating.

In a two-layer scrim, as in FIG. 1, it is preferred that the layer-connecting tapes be spaced apart from each other by a number of warp tapes that is a multiple of four, for example 12, 16, 20, etc., to provide for orderly interweaving of weft tapes.

If desired, more than one layer-connecting tape, for example a pair of such tapes, may be placed side by side (or one on top of the other) and used to connect the layers. Each line of attachment would therefore comprise the plurality of grouped, layer-connecting tapes, rather than a single tape as in the embodiment of FIGS. 1 and 2.

The scrim of the invention can comprise any number of layers that can be practically woven on a selected loom. A scrim having a desired tensile and tear strength can be achieved by making it with a sufficient number of layers. Multiple beams can be employed on a loom in order to make a multi-layer scrim of a width greater than could otherwise be formed on the loom.

Figure 3:
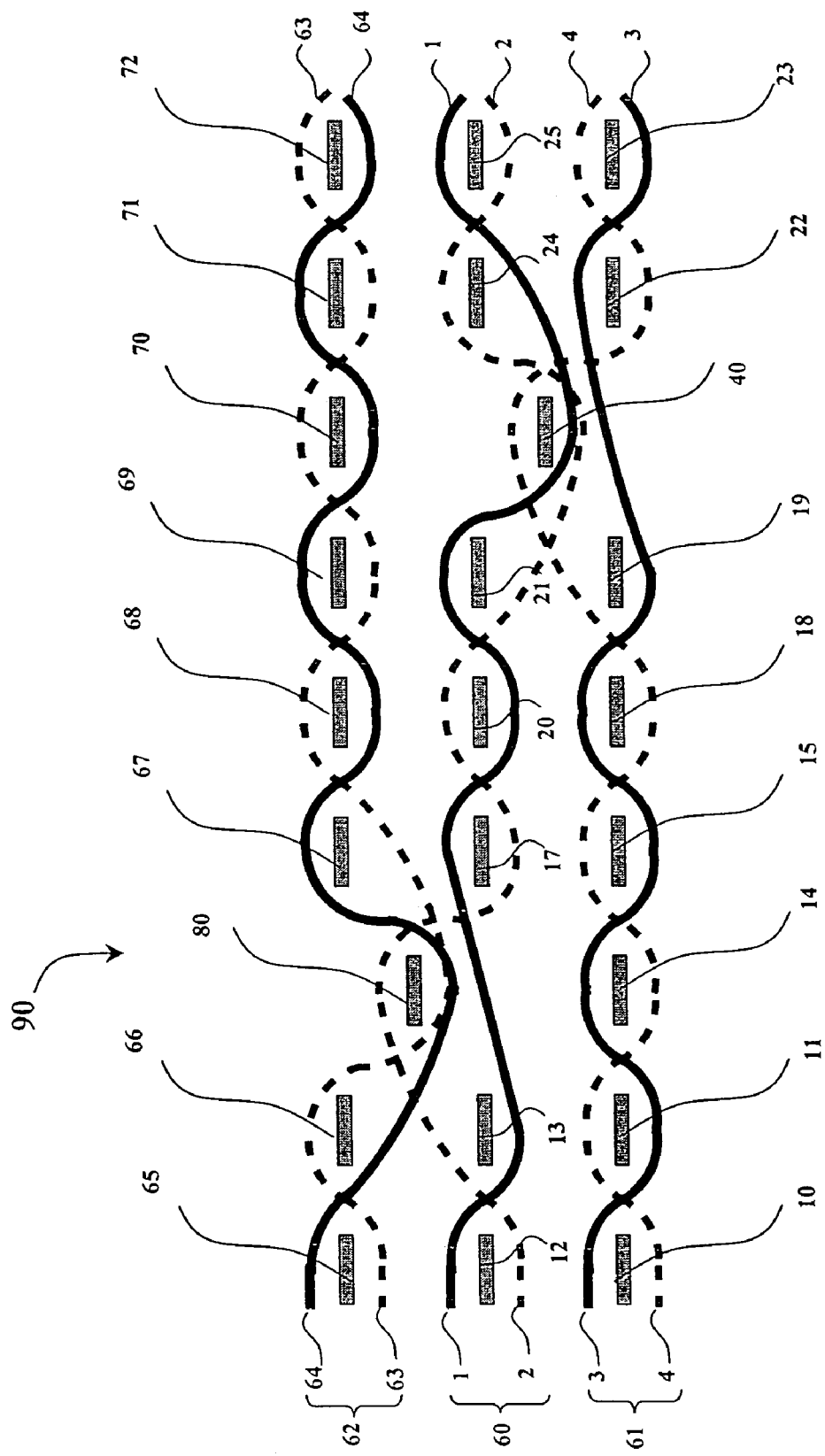
FIG. 3 is a schematic cross-sectional view of a three-layer scrim according to the invention.

For a three-layer scrim according to the invention, a third woven layer, comprising warp and weft tapes, is attached by means of a layer-connecting tape that connects the third layer to the layer to which it is adjacent. Referring to FIG. 3, which shows a three-layer scrim 90, layers 60 and 61 are structurally similar to the correspondingly numbered layers in the two-layer scrim of FIG. 2. Layer 62, comprising weft tapes 63, 64 and warp tapes 65 to 72, is attached to layer 60 by means of layer-connecting tape 80. Additional spaced-apart layer-connecting tapes (not shown), parallel to tape 80 are used to attach layer 62 to layer 60. It will be noted that the middle layer 60 is attached to each of the two outer layers 61 and 62, but such outer layers are not attached directly to each other.

In a multi-layer scrim of three or more layers, it is preferred that adjacent layer-connecting tapes that connect any given two adjacent layers be spaced apart by a number of parallel woven tapes (e.g. warp tapes in the embodiment of FIG. 3) that is a multiple of four, for example 12, 16, 20, etc.

The principles that apply to a three-layer scrim also apply to scrims of four or more layers, all of which are within the scope of the invention.

As described above, and is illustrated in the drawings, the layers of the scrims are connected by means of layer-connecting tapes interwoven with weft tapes of the layers, forming longitudinal (machine direction) lines of attachment. However, it is within the scope of the invention for the attachment to be made by means of layer-connecting tapes that are parallel to the weft tapes and interweave with the warp tapes of the layers, so as to form transverse (cross-machine direction) lines of attachment between the layers. It is also within the scope of the invention for both modes of attachment to be employed at the same time, resulting in a scrim having both longitudinal and transverse lines of attachment between the layers, forming a quilted multi-layer fabric.

It will be apparent to a person skilled in the art from the foregoing description, and in particular from FIG. 1, that the scrim of the invention is woven as a unit; in other words, by selection of the pattern of interweaving of the warp and weft tapes and the layer-connecting tapes on the loom, both layers of the scrim, and their connection by means of the layer-connecting tapes, are formed together on the loom by one weaving operation. The scrim is not made, according to the preferred embodiment, by forming the layers separately and then, subsequently, connecting them together.

In the scrims of the invention, each layer can be designed to provide different physical, mechanical or chemical properties, such as colour, UV stability, fire retardant, mold inhibition and metal corrosion inhibition. This is accomplished by appropriately selecting the tapes that will form each layer. The warp and weft tapes that will form a particular layer can be ones having specific properties, and the warp and weft tapes that will form another layer can have different properties. For example, the tapes forming the layer that will be an inner layer when the scrim is used in a metal wrapping fabric may include a metal corrosion inhibitor, while the outer layer may include a pigment.

Scrims of the invention can be laminated on one or both sides with thermoplastic films, using conventional laminating processes, to produce waterproof fabrics suitable for use as industrial fabrics, construction fabrics, building covers, tarpaulins, landfill covers, agricultural fabrics (such as hay tarps), wrapping materials and for other industrial and agricultural applications.

The film to which the scrim is laminated preferably comprises polyolefin resin, such as polyethylene or polypropylene, and may include optional additives such as UV-resistant compositions and flame-retardant compositions.

The scrims of the invention may also be used as the structural substrate for a wide range of laminated products, in the same manner as prior art multi-layer scrims are used, but bringing the advantages of a superior scrim, as described above. For example, they may be laminated on one or both sides to a layer of slip-resistant material, or to a layer of water-absorbent material, such as paper or non-woven thermoplastic mats. Such laminated products can be used as industrial and agricultural fabrics for a variety of purposes, including those described above. Uncoated or unlaminated scrim according to the invention can also be used for a variety of applications, such as industrial fabrics, construction fabrics, landfill covers, etc.

EXAMPLE

A tape made of high density polyethylene 3.3 mm wide and 48 micrometers thick, having a decitex of 1705 was woven into a multi-layer scrim according to the invention having a pick count of 16×16 and an average weight of 215 grams per square meter on a Sulzer (trademark) weaving machine. The warp, weft and layer-connecting tapes were interwoven according to the pattern shown in FIG. 1. The resulting two-layer scrim, having parallel lines of attachment in the machine direction by the layer-connecting tapes, was flat and flexible, with good tensile and tear strength.

For comparison of the mechanical strength of the scrim, scrims were woven of the same tape, with the same pick count and average weight per square meter, in a single layer twill weave pattern and in a double insertion pattern as described in U.S. Pat. No. 6,367,513 (Cain). Standard tests of mechanical strength were carried out and the results are set out below:

| Test | Double Scrim | Twill | Double Insertion |
|---|---|---|---|
| Tensile Strength-ASTM D751 | | | |
| Tensile MD (kg) | 130 | 140 | 140 |
| Tensile CD (kg) | 123 | 121 | 140 |
| Trapozoidal-ASTM 04533 | | | |
| Tear MD (kg) | 60 | 43 | 55 |
| Tear CD (kg) | 52 | 38 | 55 |
| Tongue-ASTM 02261 | | | |
| Tear MD (kg) | 62 | 44 | 58 |
| Tear CD (kg) | 47 | 41 | 57 |
| Burst-ASTM D751 | | | |
| Burst (psi) | 595 | 580 | 620 |

MD is machine direction.
CD is cross direction.

Although the invention has been described in terms of various embodiments, it is not intended the invention be limited to these embodiments. Various modifications within the scope of the invention will be apparent to those skilled in the art. The scope of the invention is defined by the claims that follow.

What is claimed is:

1. A scrim comprising at least two woven layers of thermoplastic tapes, comprising:
   (a) a first woven layer comprising:
      (i) a first set of tapes generally parallel to each other; and
      (ii) a second set of tapes generally parallel to each other, perpendicular to said first set of tapes and interwoven therewith;
   (b) a second woven layer comprising:
      (i) a first set of tapes generally parallel to each other, said first set of tapes being generally parallel to said first set of tapes of said first layer; and
      (ii) a second set of tapes generally parallel to each other, perpendicular to said first set of tapes of said second layer and interwoven therewith; and
   (c) a plurality of layer-connecting lines of attachment, generally parallel to said first sets of tapes, said lines of attachment each comprising at least one layer-connecting tape, said layer-connecting tape being interwoven with tapes of said second set of tapes of said first layer and with tapes of said second set of tapes of said second layer so as to attach said first layer to said second layer, each said line of attachment being separated from an adjacent said line of attachment by at least four tapes of said first sets of tapes.

2. A scrim according to claim 1 wherein said first set of tapes of each of said first and second layers comprises warp tapes and said second set of tapes of each of said first and second layers comprises weft tapes.

3. A scrim according to claim 1 wherein said first set of tapes of each of said first and second layers comprises weft tapes and said second set of tapes of each of said first and second layers comprises warp tapes.

4. A scrim according to claim 1 further comprising:
   (d) at least one layer-connecting line of attachment, generally parallel to said second set of tapes, said line of attachment comprising at least one layer-connecting tape, said layer-connecting tape being interwoven with tapes of said first set of tapes of said first layer and with tapes of said first set of tapes of said second layer.

5. A scrim according to claim 1 wherein said lines of attachment are separated from each other by a number of tapes of said first sets of tapes that is a multiple of four.

6. A scrim according to claim 1 further comprising:
   (d) a third woven layer, said third woven layer comprising:
      (i) a first set of tapes generally parallel to each other, said first set of tapes being generally parallel to said first set of tapes of said first layer; and
      (ii) a second set of tapes generally parallel to each other, perpendicular to said first set and interwoven therewith; and
   (e) a plurality of layer-connecting lines of attachment, generally parallel to said first set of tapes of said third layer, said lines of attachment each comprising at least one layer-connecting tape, said layer-connecting tape being interwoven with tapes of said second set of tapes of said second layer and with tapes of said second set of tape of said third layer so as to attach said third layer to said second layer, each said line of attachment being separated from an adjacent said line of attachment by at least four tapes of said first sets of tapes of said second layer and said third layer.

7. A scrim according to claim 1 wherein said tapes have a width in the range of 1 to 10 mm.

8. A scrim according to claim 1 wherein said tapes have a thickness in the range of 0.02 to 0.1 mm.

9. A scrim according to claim 1 wherein said tapes have a weight in the range of 500 to 3000 grams per 10,000 meters.

10. A scrim according to claim 1 wherein said tapes include color pigment.

11. A scrim according to claim 1 wherein said tapes comprise polyolefin resin.

12. A scrim according to claim 11 wherein said tapes comprise high density polyethylene.

13. A scrim according to claim 11 wherein said tapes comprise polypropylene.

14. A scrim according to claim 1 wherein said tapes include a UV-resistant composition.

15. A scrim according to claim 1 wherein said tapes include a flame-retardant composition.

16. A fabric comprising a scrim according to claim 1 laminated on one or both sides thereof to a waterproof thermoplastic film.

17. A fabric according to claim 16 wherein said film comprises polyolefin resin.

18. A fabric according to claim 16 wherein said film contains a UV-resistant composition.

19. A fabric according to claim 16 wherein said film contains a flame-retardant composition.

20. The use of the fabric of claim 16 as an industrial fabric, tarpaulin, landfill cover, construction fabric or agricultural fabric.

21. A fabric comprising a scrim according to claim 1 laminated on one or both sides thereof to a layer of slip-resistant material.

22. A fabric comprising a scrim according to claim 1 laminated on at least one side thereof to a metalized film.

23. A fabric comprising a scrim according to claim 1 laminated on one or both sides thereof to a layer of water-absorbent material.

24. A fabric according to claim 23 wherein said water-absorbent material is paper.

25. A fabric according to claim 23 wherein said water-absorbent material comprises non-woven thermoplastic fibres.

26. The use of the scrim of claim 1 as an industrial fabric, construction fabric or landfill cover.

27. A scrim according to claim 1 wherein said line of attachment comprises two or more of said layer-connecting tapes.

28. A scrim according to claim 1 wherein each said line of attachment is separated from an adjacent said line of attachment by at least twelve tapes of said first sets of tapes.

* * * * *

UNITED STATES PATENT AND TRADEMARK OFFICE
CERTIFICATE OF CORRECTION

| | | |
|---|---|---|
| PATENT NO. | : 7,132,376 B2 | Page 1 of 1 |
| APPLICATION NO. | : 10/785149 | |
| DATED | : November 7, 2006 | |
| INVENTOR(S) | : Mohamed Abdel Aziz Rashed | |

It is certified that error appears in the above-identified patent and that said Letters Patent is hereby corrected as shown below:

In column 3 line 15, please delete "warp".

In column 3 line 16, please delete "weft tape 10" and replace it with --warp tape 10--.

Signed and Sealed this

Sixth Day of March, 2007

JON W. DUDAS
*Director of the United States Patent and Trademark Office*